(12) United States Patent
Clausen

(10) Patent No.: US 8,440,088 B2
(45) Date of Patent: May 14, 2013

(54) PRIMING METHOD FOR FILTER

(75) Inventor: Michael D. Clausen, Turlock, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 210 days.

(21) Appl. No.: 12/773,043

(22) Filed: May 4, 2010

(65) Prior Publication Data

US 2010/0300988 A1     Dec. 2, 2010

Related U.S. Application Data

(60) Provisional application No. 61/181,436, filed on May 27, 2009.

(51) Int. Cl.
*B01D 37/00* (2006.01)
*B01D 61/00* (2006.01)
*C02F 1/00* (2006.01)
*B01D 24/46* (2006.01)
*B01D 29/62* (2006.01)
*B01D 33/44* (2006.01)
*B01D 35/22* (2006.01)
*B01D 41/00* (2006.01)
*B01D 35/00* (2006.01)

(52) U.S. Cl.
USPC ........... 210/767; 210/791; 210/443; 210/348; 210/359

(58) Field of Classification Search ................... None
See application file for complete search history.

(56) References Cited

U.S. PATENT DOCUMENTS

| | | | |
|---|---|---|---|
| 4,298,358 A * | 11/1981 | Ruschke | 96/174 |
| 4,954,251 A * | 9/1990 | Barnes et al. | 210/806 |
| 4,997,555 A | 3/1991 | Church et al. | |
| 5,643,446 A | 7/1997 | Clausen et al. | |
| 5,868,931 A | 2/1999 | Janik et al. | |
| 2004/0164017 A1 | 8/2004 | Knight | |
| 2005/0178734 A1 * | 8/2005 | Kilmer et al. | 210/791 |
| 2007/0187317 A1 * | 8/2007 | Graetz et al. | 210/321.6 |

OTHER PUBLICATIONS

International Search Report and Written Opinion in corresponding International Application No. PCT/US2010/031969.

* cited by examiner

*Primary Examiner* — Nam Nguyen
*Assistant Examiner* — Clare Perrin
(74) *Attorney, Agent, or Firm* — Christopher H. Hunter

(57) ABSTRACT

A priming method for a filter, whereby the outlet of a spent filter is connected to the inlet of a fresh filter, and the spent filter is inverted. A drain in the spent filter is then opened to allow air to enter the spent filter and fluid to drain from the clean side of the spent filter into the fresh filter.

11 Claims, 7 Drawing Sheets

PRIMING METHOD FOR FILTER

CROSS REFERENCE TO RELATED APPLICATIONS

The present application claims the benefit of the filing date of U.S. Provisional Patent Application Ser. No. 61/181,436, filed May 27, 2009, the disclosure of which is incorporated herein by reference in its entirety.

FIELD OF THE INVENTION

The present invention relates generally to fluid filters, and to a method for priming such filters.

BACKGROUND OF THE INVENTION

Certain fluid filters are supported on a bracket (or other support device), and have a quick-release feature to allow the filter to be quickly and easily removed from such bracket. In a vehicle for example, it can be desirable to have a bracket on an engine, in the engine compartment, or other appropriate support location on the vehicle, and to have quick attachment means for mounting the filter to the bracket, and for removing the filter when it is desirable, for example, to access the filter remotely for repair, or for replacement of a spent element.

The type of attachment (or connection) for such application should be robust and secure, and prevent inadvertent detachment of the filter from the bracket during use. Nevertheless, it should be relatively easy to attach and detach the filter from the bracket when desired. And of course, in general, the connection should also be relatively lightweight, compact, easy to assemble, and cost-effective to manufacture.

It is known to provide a T-slot on the back side of a filter that slides into a slot in a bracket. The filter is basically just slid axially downwards onto the slot for attachment, and slid axially upwards off the bracket for detachment. This can be appropriate when there is sufficient axial space to accomplish this movement, and when the hoses are either long enough or in an appropriate location to allow for this, or can be detached from the element prior to such axial movement. It is also known to provide a bracket with slots and openings, and a mounting piece on the back of the filter that includes posts and a spring clip, and which engages the slots and openings when the filter is slid axially onto the bracket. Once the filter is installed, the spring clip engages the bracket and retains the filter on the bracket until the clip is depressed and the filter can then be axially slid off the bracket. This technique also requires sufficient axial space, requires access to the spring clip on the back of the filter, and has the same issues as described above with respect to the hoses.

U.S. patent application Ser. No. 12/472,668, for "Filter With Quick Attachment Features", filed May 27, 2009, addresses at least some of the issues associated with such prior art, and provides a filter and a connection for such filter to a bracket or other support device, which does not require the full axial movement of the filter with respect to the bracket for attachment and detachment; but rather allows the filter to be removed primarily by pivoting the element away from the bracket. Such a connection and technique requires less free space above the filter, does not require access to the rear of the filter, and is less disruptive of any attached hoses and other components.

After such a filter is removed from a bracket or other support, and a new filter with a fresh element is to be mounted to the bracket, it is a common issue that the new filter needs to be primed before it is used. That is, the new filter is filled with air, and it is desirable to remove (bleed) the air from the filter before use as the air pocket may block some of the media from being used for filtration and can otherwise cause issues within the fluid system (e.g., it can be more difficult to start an engine). Various techniques have been used to prime filters, including using a bleed valve and priming pump to force fluid into the media, as in Clausen U.S. Pat. No. 5,643,446. While some techniques have proved successful in the marketplace, it is believed there is a demand in the industry for yet a further technique—and particularly for a technique that is simple and straightforward, and results in most if not all air being removed from an element prior to its use without requiring pumps or specialized valves.

SUMMARY OF THE INVENTION

The present invention provides a method for priming a filter which is simple and straightforward, and results in most if not all air being removed from the filter prior to its use. Such a technique does not require additional pumps or specialized valves.

According to the present invention, the filter includes a ring of filtration media enclosed within a canister, and an end cap is fixed to the open upper end of the canister. Inlet and outlet ports are provided in the end cap to direct fluid into and out of the canister. The filter further includes attachment structure to enable the filter to be attached to a bracket or other support surface. The attachment structure includes a pair of radially-outward projecting pivots located on opposite sides of the canister toward a lower end thereof. The pivots each comprise a base and an enlarged head, with the head including an underside tapered surface defining a lip. The base defines a stand-off, with the stand-offs being dimensioned to be closely received within the sidewalls of the bracket.

The attachment structure further includes a pair of retaining clips also located on opposite side of the canister, but toward the upper end thereof. Each clip is in substantial axial alignment along the side of the housing with a respective pivot, and has a radially flexible axial body portion, and an integral tab portion at the free end of the retaining clip. An outwardly-projecting stand-off is also provided adjacent the tab end of the retaining clip, with the stand-offs of the clips being dimensioned to be closely received within the arms of the bracket, and preventing the tab ends of the clips from being pressed against the sides of the canister; or in other words, allowing some free space between the tab ends of the clips and the canister such that the tabs can be pressed inwardly when it is desired to remove the filter from the bracket, as will be more fully described herein.

The bracket for the filter includes a body and a pair of side walls, with the sidewalls projecting outwardly from the body in spaced-apart relation such that the filter can be closely received therebetween. Each of the sidewalls includes i) a hook-shaped slot dimensioned to receive a respective pivot on the filter, and allow the filter to pivot from an orientation at an angle to the longitudinal axis of the bracket, to an orientation where the filter is substantially axially-aligned with and supported against the bracket; and ii) a catch dimensioned to engage and retain a respective retaining clip, when the filter is aligned with the bracket. The inner tapered lip surface on the head of each pivot facilitates locating the pivots within the hook-shaped slots, and hence facilitates locating the filter on the bracket. The stand-offs on the base of the pivots help orient the filter with the bracket, and ensure a secure and robust connection.

The tab on each clip can include a radial projection which is received in a small slot or hole in the bracket, to lock the filter to the bracket. Pressing the tabs inwardly toward the canister releases the projections from their respective slots, and enables the upper end of the filter to be pivoted away from the bracket. The filter can then be lifted slightly upwardly and outwardly away from the bracket such that the pivots are removed from their respective hook-shaped slots and the filter can be inspected, repaired and/or replaced.

When the filter is to be replaced with a filter having a fresh element, a cap is located over the inlet to the spent filter, and the outlet of the spent filter is connected to the inlet of the fresh filter via a short connector tube. The spent filter is then inverted, the drain for the spent filter is opened, and the fluid in the spent filter is allowed to drain under gravity into the fresh filter until the fluid fills the fresh filter and all the air is expelled through the outlet port of the fresh filter. As the fluid passing into the fresh filter is from the "clean" side of the spent filter, the fresh filter will not become loaded with particulate matter before use. The spent filter can then be disconnected from the fresh filter, and disposed of as appropriate. As an additional benefit, the spent filter is essentially devoid of fluid, which facilitates disposal of the filter in a landfill or other waste disposal facility. The fresh filter can then be connected to the hoses within the system and mounted such as to the support bracket described above.

DETAILED DESCRIPTION OF THE PREFERRED EMBODIMENT

Figure 1:
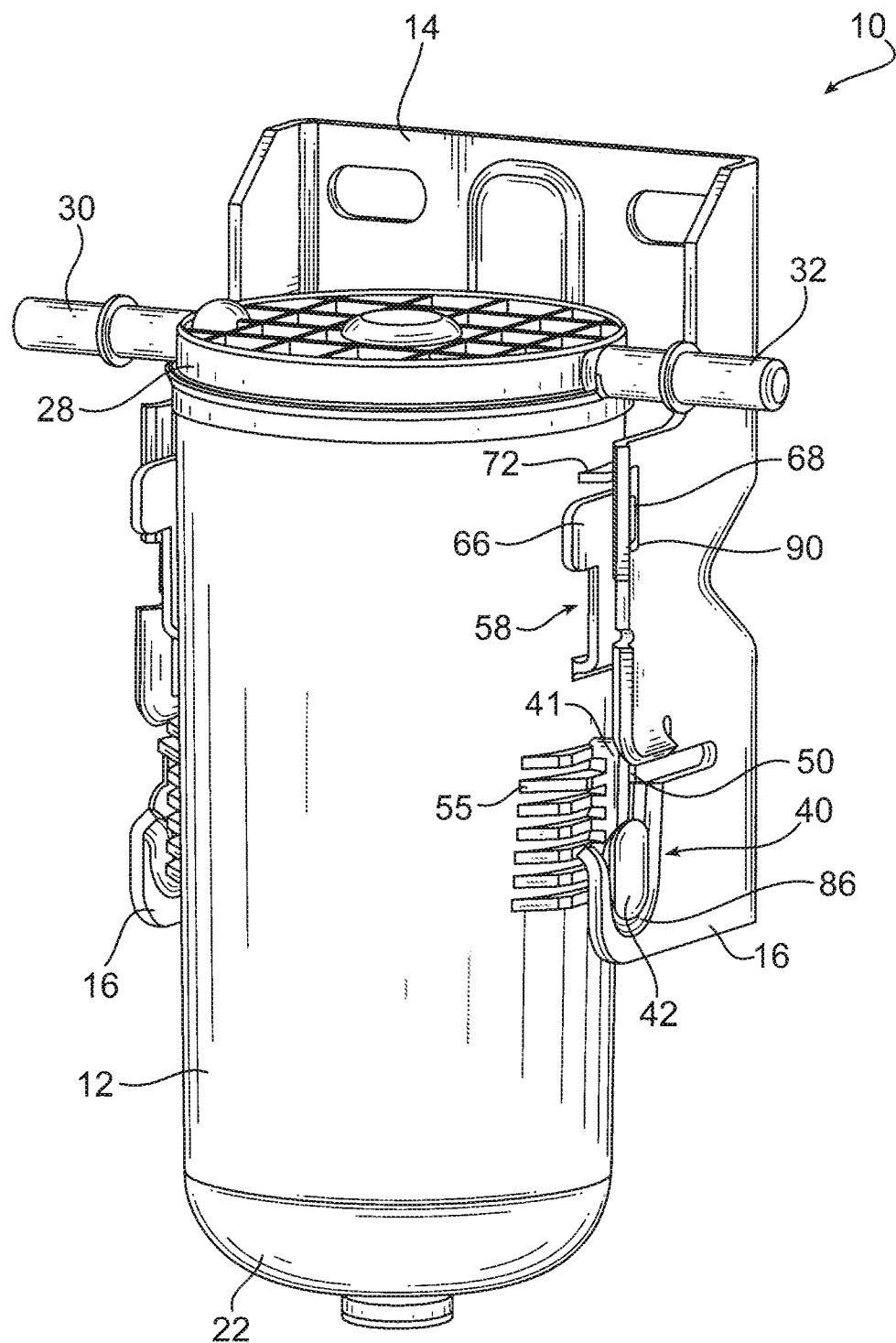
FIG. 1 is an elevated perspective view of a filter assembly according to the present invention.

Referring to the drawings, and initially to FIG. 1, a filter assembly according to the present invention is indicated generally at 10. Filter assembly 10 includes a filter 12 and a support bracket 14 with sidewalls 16. Filter 12 and bracket 14 have a quick attachment feature as will be described below.

Figure 2:
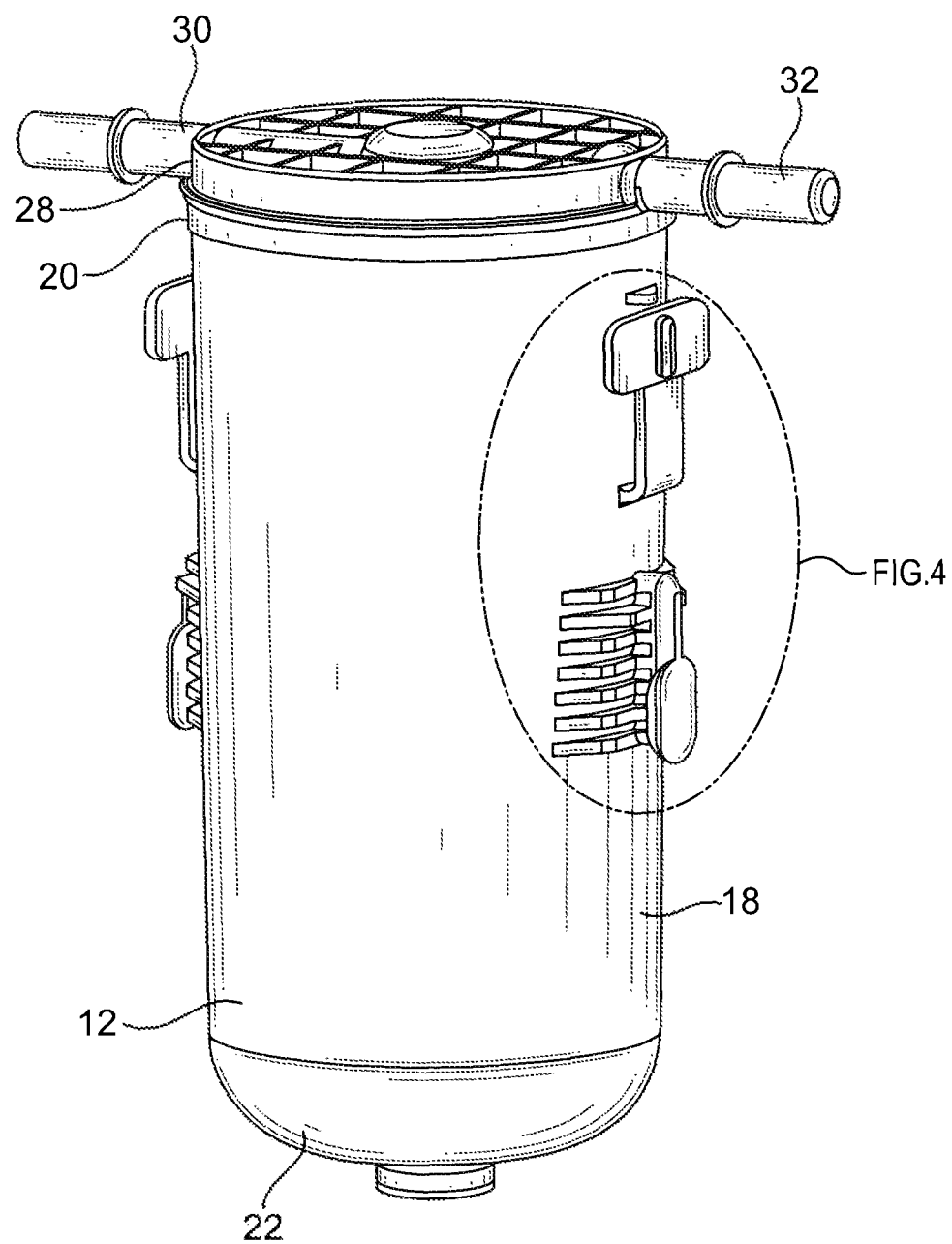
FIG. 2 is an elevated perspective view of the filter for the assembly of FIG. 1.
Figure 3:
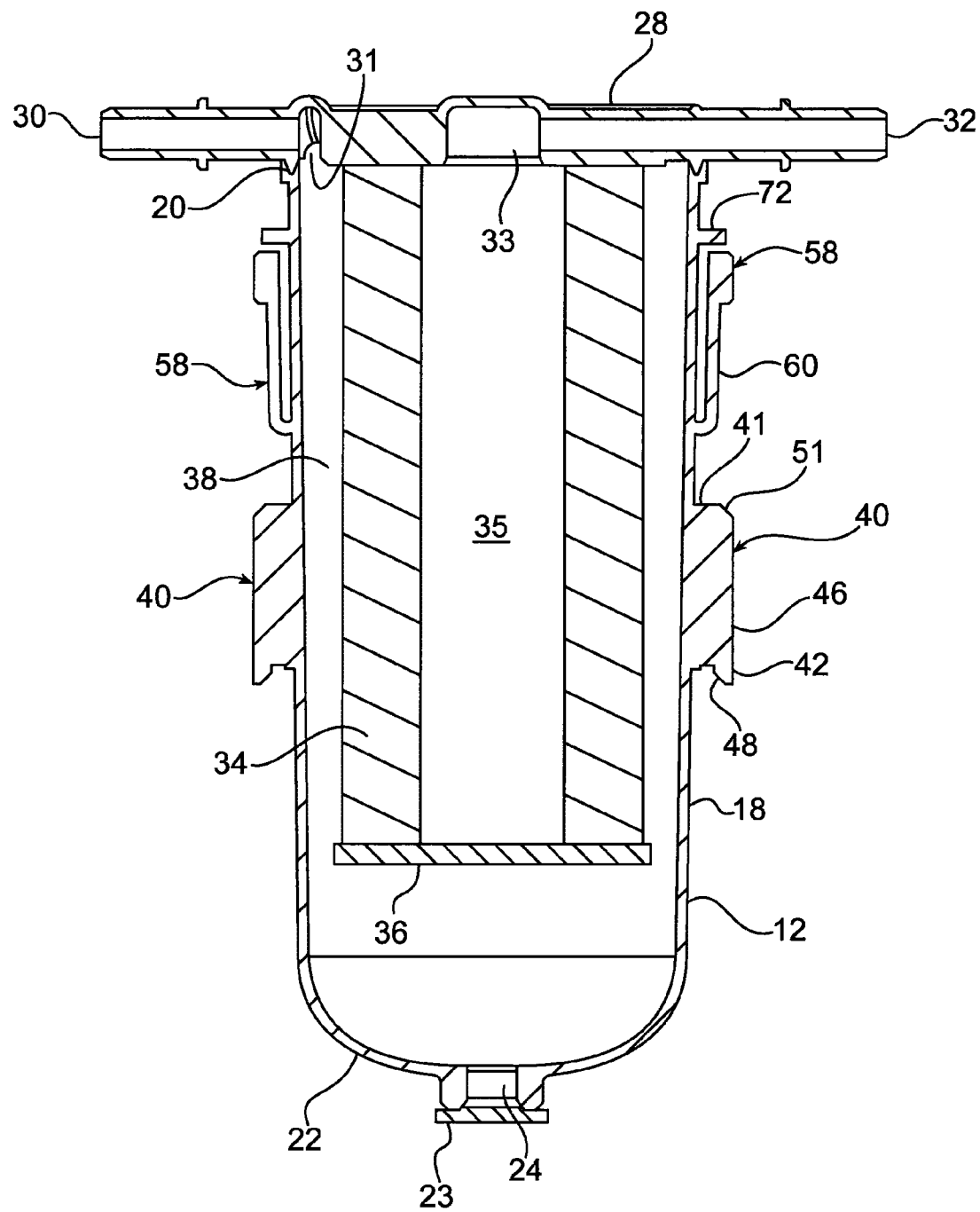
FIG. 3 is a cross-sectional side view of the filter of FIG. 2.
Figure 4:
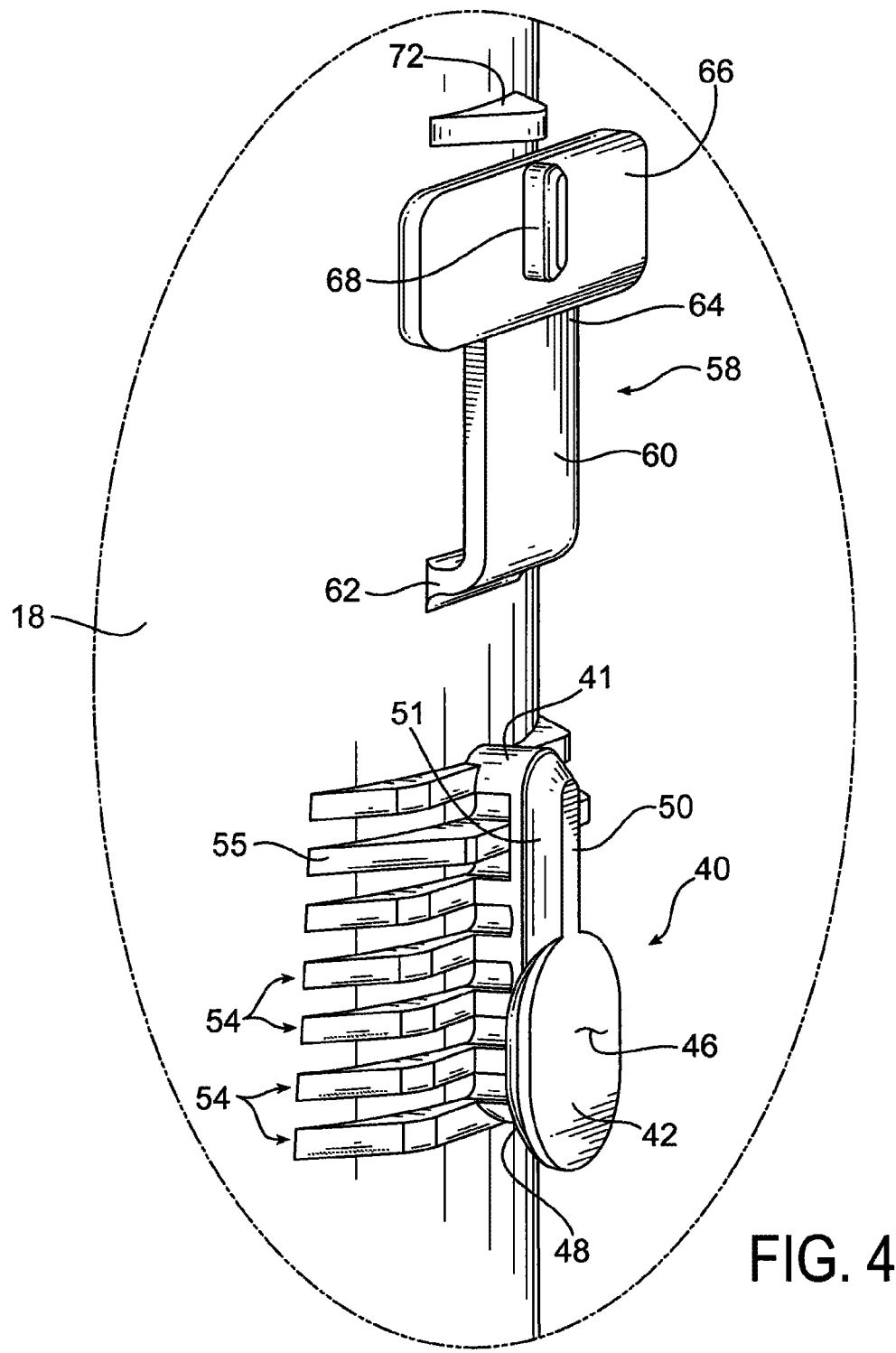
FIG. 4 is an enlarged view of a portion of the filter shown in FIG. 2.

Referring now to FIGS. 2-4, filter 12 includes an outer cup-shaped canister or housing 18 with an open upper end 20 and a closed lower end 22. A drain 23 (FIG. 3) can be located in a threaded opening 24 in the lower end of the housing to allow periodic removal of water from the filter. Canister has a generally cylindrical shape, although it can be other shapes; and can be formed from material appropriate for the particular application, such as plastic or metal.

An end cap or lid 28 is attached such as by adhesive, welding or other bonding means to the upper end of the canister. End cap 28 includes an inlet port or tube 30 with an internal opening 31 to direct fluid to be filtered into the canister; and an outlet port or tube 32 with an internal opening 33 to direct filtered fluid out of the canister. A filter element 34 is centrally located in the canister, and has a ring-shaped configuration circumscribing a central cavity 35. Element 34 includes a lower circular end cap 36 sealingly bonded to the lower end of the media ring, while the upper end of the element is sealingly bonded directly to the end cap 28. Filter element 34 can have a structure (e.g., pleated, fibrous, etc) and be made from a material (e.g., cellulose, polymer) which is appropriate for the particular application, and likewise can have a geometry other than ring-shaped if so desired. While an element is shown and described which cannot be removed from the canister when spent, or in other words, the entire canister must be disposed of when the element becomes spent; it is also anticipated that the canister could have a removable upper end cap which would provide access to the element in the housing to enable replacement. Such a structure enabling removal of the element (e.g., threads) should be well-known to those skilled in the art.

In any event, fluid entering inlet port 30 flows into a peripheral annular region 38 between the element and the inside surface of the housing, where the fluid then flows radially inward through the element where particulate matter and other contaminants are removed, and into the central cavity 35. If the element has hydrophobic properties, water collecting on the outer surface of the element can agglomerate, and drip downward into the lower portion of the housing where it can be removed through drain opening 24.

The fluid then flow axially upward and outward through outlet port 32 to return to the fluid system. It is also anticipated that the flow through the element could be in the reverse direction; that is into port 32 and out of port 30, and travel radially outward through the media.

As indicated above, filter 12 includes structure which enables the filter to be quickly and easily attached to and removed from bracket 14. To this end, a pair of identical, radially-outward projecting rigid pivots, indicated generally at 40, are provided on the outer surface of the canister, on opposite sides thereof, between about the midpoint and the lower end of the canister. Pivots 40 each comprise a short, axially-extending base 41, and an enlarged circular head 42 projecting radially outwardly toward the lower end of the base. Head 42 includes a flat outer surface 46, and an inwardly-tapered or angled lower surface 48 which forms a lip around the head and interconnects the head 42 to the base 41. Pivots 40 each have a surface extension 50 which is interconnected to head 42 and is flush (co-planar) with surface 42; that is, surface extension 50 has the same outer dimension as head 42. The sides of the surface extension 50 are tapered or angled as at 51, and each surface extension extends axially a short distance along the side surface of the canister toward the open end of the canister from head 42. As will be explained below, surface extension 50 of base 41 provides a stand-off against the sidewalls 16 of bracket 14 when the filter is mounted to the bracket.

A series of angled or tapered ridges as at 54 are provided on either side of base 41, in axially spaced apart relation and extending in the circumferential direction, that is, perpendicular to the axial extent of the canister, to facilitate locating the filter within bracket 14. Ridges 54 have an outer dimension such that the ridges can engage the inside surface of the sidewalls of the bracket and help direct the filter between the sidewalls as the filter is mounted to the bracket. One of the ridges 55, has a greater radial projection, in other words, it projects radially outward further than the others, and serves as a locating and supporting ridge for the filter in the bracket, as will be discussed in greater detail below.

Base 41, head 42 and ridges 54 can all be formed in one piece with the canister during the forming of the canister; or alternatively can be formed in one or more separate pieces and attached to each other and/or to the canister such as with adhesive or other bonding techniques.

The attachment structure further includes a pair of flexible retaining clips as at 58, also provided on the outer surface of the canister, on opposite sides thereof, between about the midpoint and the upper end of the canister. Clips 58 are each in general axial alignment with a respective pivot 40, and can be spaced axially therefrom. Each retaining clip includes a thin, flexible, axially-extending body portion 60, in generally parallel relation to the outer surface of the canister, and connected at a base end 62 to the canister, and extending axially to a free head end 64 spaced radially-outward from the canister. The free end 64 of the clips can be flexibly bent toward the canister by appropriate manual manipulation of the clip. A release tab 66 with a flat outer surface is provided at the head end of the clip to facilitate this manipulation, and projects generally perpendicular to the extent of the body portion 60.

A radial projection 68 is provided in generally the middle of each tab 66, and extends generally a short distance along the axis of the clip. Radial projection 68 enables the retaining clip to lock to a respective sidewall of the bracket, and hence retain the filter on the bracket, as will be described below.

Finally, a radial stand-off 72 is provided in axially-spaced relation to each tab 66, between the tab and the upper end of the canister, and projecting radially outward about the same radial distance as tab 66 (minus the projection). As will be described below, stand-offs 72 prevent sidewalls 16 of bracket 14 from bending clips 60 completely against the surface of the canister, that is, the free ends of the clips remain somewhat spaced from the outer surface of the canister even after the filter is mounted on the bracket, such that the clips can be manipulated when it is desired to release the filter from its locked position with the bracket, as again, will be described more fully below.

Clips 58, tab 66 and standoffs 72 also can all be formed in one piece with the canister during the forming of the canister; or alternatively can be formed in one or more separate pieces and attached to each other and/or to the canister such as with adhesive or other bonding techniques.

Figure 5:
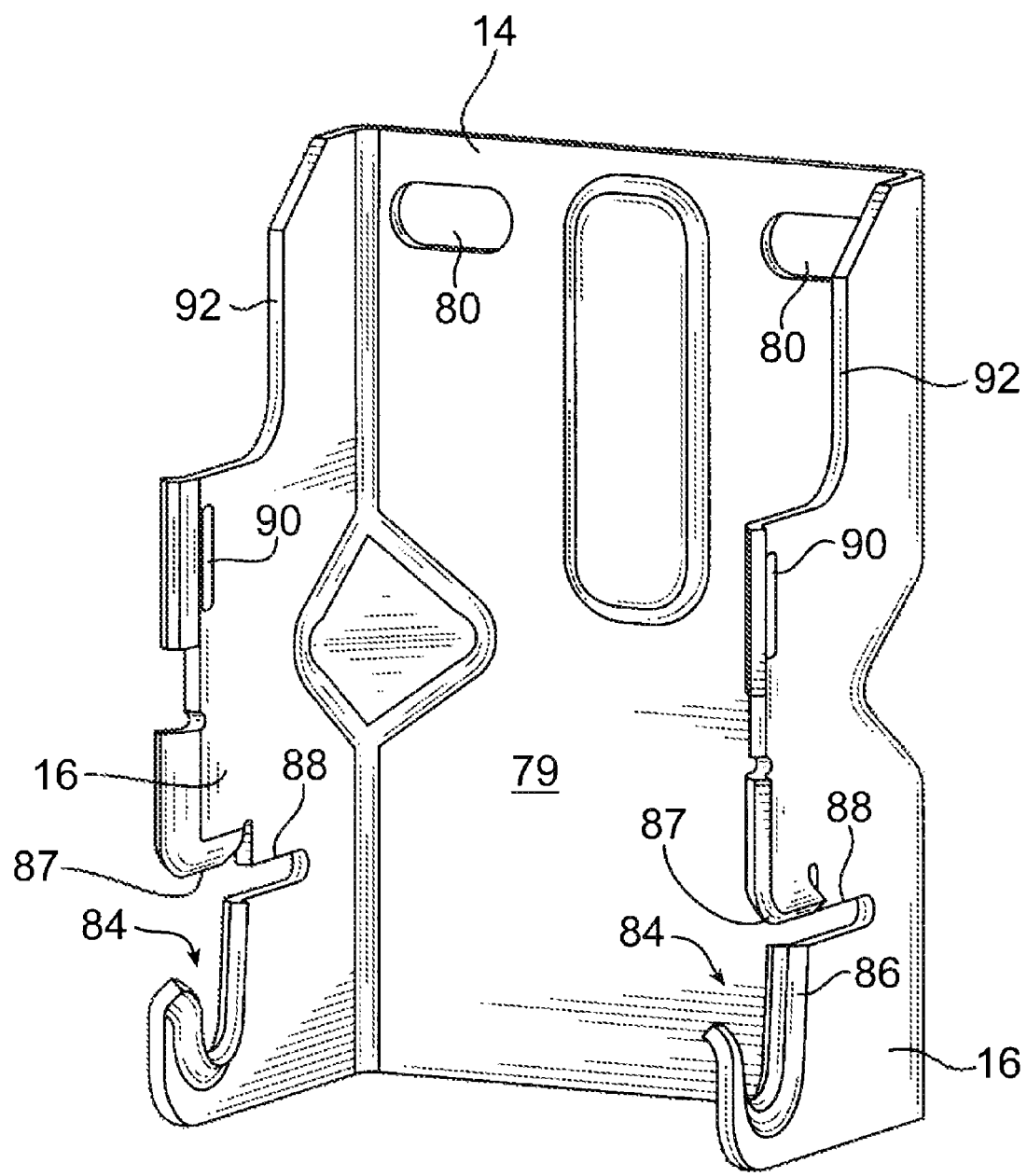
FIG. 5 is an elevated perspective view of a bracket for the assembly of FIG. 1.

Referring now to FIG. 5, the bracket 14 includes a flat body 79 with apertures 80 or other means to attach the bracket to an appropriate support surface, such as an engine block, or engine compartment. The sidewalls 16 of the bracket are each spaced apart from each other along opposite sides of body 79, and run generally parallel to each other and perpendicular to the body 79. The spacing of sidewalls 16 is such that the filter canister can be generally closely received therebetween. Sidewalls 16 each include a hook-shaped slot, as at 84, along the side edge of the sidewall and toward the lower end thereof, and opening generally toward the upper end of the bracket. The sidewall has a tapered or rounded surface 86 around the lower edge of each slot, and a tapered or rounded surface 87 around the upper edge of each slot, and the opening is dimensioned to receive the base 41 of the pivot (FIG. 4) in the area under the head 42.

A thin slot 88 is provided axially upward from opening 84, and extends from the side edge of the sidewall inwardly toward the body 79, that is, horizontally relative to the longitudinal axis of the body. Slot 88 provides some flexibility to allow the sidewalls to bend and closely receive the filter as the filter is mounted to the bracket. The sidewalls generally conform as the ridges 54, and in particular locating ridge 55, are received between the sidewall as the filter is pivoted into its assembled position with the bracket.

An axial slot 90 or other appropriate geometry such as a ridge, is next provided axially upward from the slot 88 on the sidewalls toward the upper end of the bracket sidewalls, with slot 90 dimensioned to receive the projection 68 (FIG. 4) on the tab of the clip. The slot 90 or other geometry provides a catch which retains the upper end of the filter to the bracket when the filter is mounted to the bracket, as will be described below.

Finally, each sidewall includes a rounded cut-out shoulder portion 92 which is generally dimensioned and located to receive the inlet and outlet ports 30, 31 (FIG. 1) of the upper end cap when the filter is mounted to the filter head.

Figure 6:
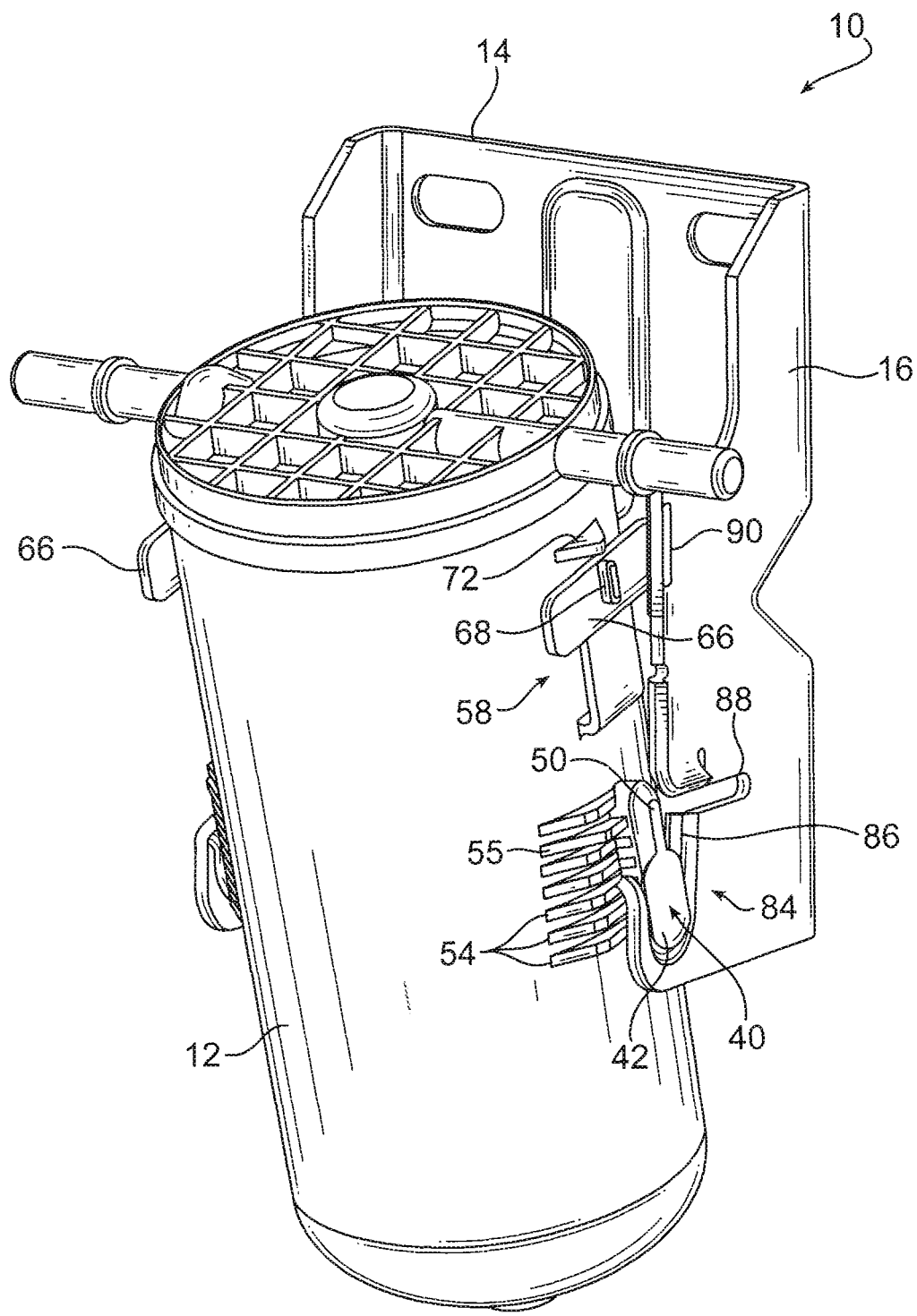
FIG. 6 is an elevated perspective view of the filter assembly of FIG. 1, showing the filter partially assembled with the bracket.

During connection of the filter to the bracket, as shown in FIG. 6, the filter is initially inserted into the bracket such that the pivots 40 are each received in a respective slot 84. The slot 84 receives the base of the pivot, and the filter can pivot around this support while the filter is being mounted to the bracket, that is, as the filter is being brought into axial alignment with and substantially flush against the body of the bracket. The tapered inner lip surface of each head 42 and the tapered or rounded lower surface of the corresponding slot 84, facilitates locating the pivots with the slots. As the filter is pivoted, the extended locating ridge 55 on the base of each pivot guides the filter between the sidewalls 16. The base projection 50 then engages the inside surface of the sidewalls as the tapered sides 51 of the projection pass inwardly against the rounded upper surface 87 of the slot 84 (in effect pushing the sidewalls outwardly); and, along with the head 42 being closely received and supported by the rounded edges 86 on the lower portion of the slot 84 (in effect pulling the sidewalls inwardly), the lower end of the filter is thereby securely held on the bracket when the filter is completely mounted to the bracket (e.g., as shown in FIG. 1).

As the filter is brought into alignment with the bracket, the retaining clips 58 on the filter are received between the sidewalls, and projections 68 engages the sidewalls, and force the clips slightly inwardly until the projections pass into the corresponding slots 90 in the sidewalls. Tabs 66 remain accessible and project outwardly from the sidewalls of the bracket. Stand-offs 72 adjacent the clips keep the upper end of the filter properly centered between the sidewalls and prevent the sidewalls from bending each clip flat against the canister. Once the projections 68 enter their respective slots 90, the clips flex outwardly and the filter is locked in its horizontal mounting orientation to the bracket. The filter can be supported against the body of the bracket, although it can also be held a small distance outwardly therefrom, as the connection with the pivots 40, including the locating ridges 55, and with the retaining clips 58, securely hold the filter to the bracket irrespective of whether the filter is supported against the body. Hoses can then be connected to the inlet port 30 and outlet port 32 of the filter to fluidly connect the filter within the fluid system.

To remove the filter from the fluid system, the hoses can be removed, and the tabs 66 of the clips can be accessed and inwardly depressed to move the projections 68 out of engagement with slots 90, and allow the filter to be pivoted into the FIG. 6 position, where it can then be lifted upwardly and outwardly from the bracket. The pivots 40 are generally located on the filter canister such that the filter can be pivoted sufficiently without interference from the end of the canister bottoming against the bracket or adjacent support surface. Again, the stand-offs 72 of the retaining clips keep the clips at a distance from the canister, such that they can be later depressed to allow detachment of the filter from the bracket.

While the filter has been described above being mounted to a stand-alone bracket, and the bracket is then mounted to an appropriate location such as to an engine block or engine compartment, it should be appreciated that such bracket could be incorporated as an integral part of the engine or compartment, or other support surface. In such case, the body of the bracket could be a portion of the engine, engine compartment or other support surface. In addition, while the attachment structure above has been described as including the combination of the pivots 40 including an enlarged head 42 with lip 48, and extension 50, ridges 54 and locating ridge 55; and retaining clips 58 including tabs 66 and projections 68, it should be appreciated that one or more of these components on the pivots and/or the retaining clips could be absent on one or both sides of the filter, and the filter 12 could still be mounted to the bracket 14.

Figure 7:
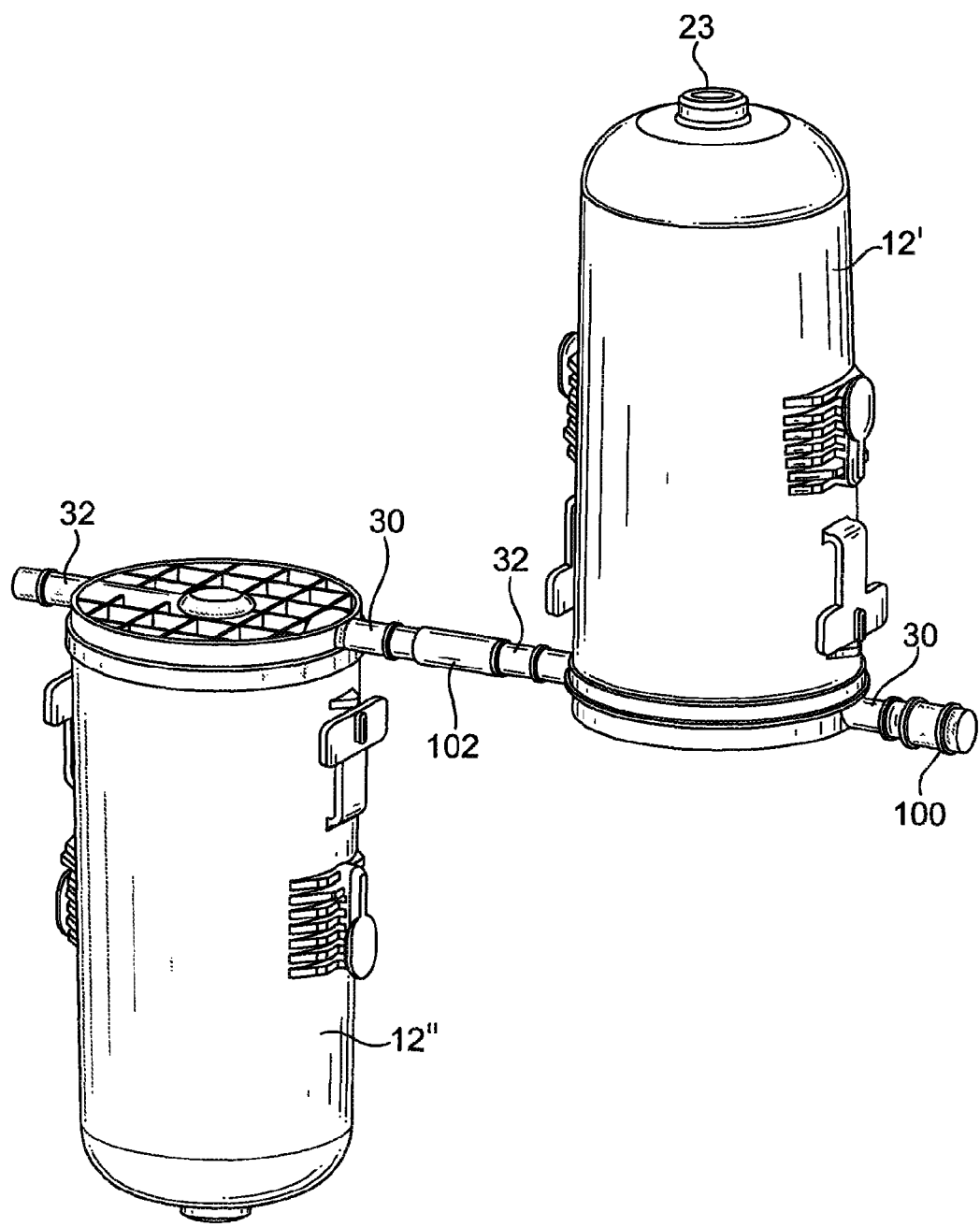
FIG. 7 is an elevated perspective view of a spent filter connected to a fresh filter showing the priming method of the present invention.

Referring now to FIG. 7, after a spent filter 12' is removed from the system, and it is desired to replace the spent filter with a fresh filter 12", a cap 100 is located on the inlet port 30 of the spent filter. A short connector tube 102 is then located on the outlet port 32 of the spent filter 12' and connected to the inlet port 30 of the fresh filter 12". The spent filter 12' is then inverted as shown, and the drain 23 in the spent filter (now at its upper end) is opened to allow air to enter the spent filter. As air enters the spent filter 12', the fluid in the spent filter drains under gravity and passes into the fresh filter 12". Fluid on the clean side of the spent filter drains directly through the outlet port, while fluid on the "dirty" side of the element drains through the media and then through the outlet port. The fluid essentially fills the fresh filter and expels the air in the filter out through outlet 32 to fully prime the filter. As the volumes of both filters are essentially the same, fluid should not pass out of the outlet port 32 of the fresh filter.

When the spent filter 12' is completely drained, the connector 102 is removed from the fresh filter and the fresh filter can be mounted to the bracket as described above. The empty spent filter can then be disposed of in a landfill or other waste disposal facility.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A method for priming a fresh filter, the said fresh filter having filtration media enclosed within a housing having a drain in a lower end, and the housing including inlet and outlet ports in an upper end to direct fluid into and out of the housing, the filtration media in said fresh filter becoming spent over time as the filter removes particulate and other contaminants in a fluid stream passing through the media; the method comprising i) closing an inlet port of a spent filter and connecting an outlet port of said spent filter to said inlet port of said fresh filter; ii) inverting said spent filter; iii) opening the drain in said spent filter in an inverted position to allow air to enter said spent filter through the drain, and fluid in said spent filter to drain under gravity into said fresh filter, and thereby expelling air in said fresh filter through said outlet port of said fresh filter; and iv) disconnecting said spent filter from said fresh filter.

2. The method as in claim 1, wherein said spent filter is connected via a tube to said fresh filter when the fluid drains under gravity to said fresh filter.

3. The method as in claim 1, wherein a cap is initially located so as to close said inlet port of said spent filter, as the fluid is drained to said fresh filter.

4. The method as in claim 1, wherein the step of inverting said spent filter further includes locating the drain above the level of said outlet port of said spent filter.

5. The method as in claim 4, wherein air enters the lower end of said spent filter when said spent filter is inverted and the air enters the drain of said spent filter.

6. A method for priming a fresh filter, the said fresh filter having filtration media enclosed within a housing having a drain in a lower end, and the housing including inlet and outlet ports in an upper end cap to direct fluid into and out of the housing, the filter media in said fresh filter becoming spent over time as the filter removes particulate and other contaminants in a fluid stream passing through the media; the method comprising in sequence: i) locating a cap over an inlet port of a spent filter so as to close said inlet port and connecting an outlet port of said spent filter via a tube to said inlet port of said fresh filter; ii) inverting said spent filter; iii) opening the drain in said spent filter in an inverted position to allow air to enter said spent filter through the drain, and fluid in said spent filter to drain under gravity into said fresh filter, and thereby expelling any air in said fresh filter through said outlet port of (said) fresh filter; and iv) disconnecting said spent filter from said fresh filter.

7. The method as in claim 6, wherein the step of inverting said spent filter further includes locating the drain above the level of said outlet port of said spent filter.

8. The method as in claim 7, wherein air enters the lower end of said spent filter when said spent filter is inverted and the air enters the drain of said spent filter.

9. A method for priming a fresh filter, the said fresh filter having filtration media enclosed within a housing, and the housing including inlet and outlet ports in an upper end to direct fluid into and out of the housing and a drain opening in a lower end of the housing, the filtration media in said fresh filter becoming spent over time as the filter removes particulate and other contaminants in a fluid stream passing through the media; the method comprising i) closing an inlet port of a spent filter and connecting an outlet port of said spent filter to said inlet port of said fresh filter; ii) inverting said spent filter; iii) allowing air to enter the drain opening in the lower end of the housing and fluid in said spent filter in an inverted position to drain under gravity into said fresh filter, and thereby expelling air in said fresh filter through said outlet port of said fresh filter; and iv) disconnecting said spent filter from said fresh filter.

10. The method as in claim 9, wherein the step of inverting said spent filter further includes locating the drain opening above the level of said outlet port of said spent filter.

11. The method as in claim 10, wherein air enters the lower end of said spent filter when said spent filter is inverted and the air enters the drain opening of said spent filter.

\* \* \* \* \*